(12) United States Patent
Cadwell et al.

(10) Patent No.: US 10,479,348 B2
(45) Date of Patent: Nov. 19, 2019

(54) HYBRID VEHICLE AND METHOD OF REDUCING ENGINE LUGGING

(71) Applicant: FORD GLOBAL TECHNOLOGIES, LLC, Dearborn, MI (US)

(72) Inventors: Floyd Cadwell, Dearborn, MI (US); Shunsuke Okubo, Belleville, MI (US); Carol Louise Okubo, Belleville, MI (US); Kimberly Trice, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 15/044,338

(22) Filed: Feb. 16, 2016

(65) Prior Publication Data
US 2017/0232956 A1   Aug. 17, 2017

(51) Int. Cl.
*B60W 20/17*   (2016.01)
*B60K 6/24*    (2007.10)
*B60W 10/06*   (2006.01)

(52) U.S. Cl.
CPC ........... *B60W 20/17* (2016.01); *B60K 6/24* (2013.01); *B60W 10/06* (2013.01); *B60W 2510/0652* (2013.01); *B60W 2510/0661* (2013.01)

(58) Field of Classification Search
CPC ......... B60W 20/17; B60W 2510/0638; B60W 2510/0652; B60W 2510/081; B60W 2510/082; B60W 2550/12; B60W 30/20; B60W 2030/206; F02D 31/001–009

USPC ............... 701/22, 110, 111; 180/65.1–65.8
See application file for complete search history.

(56) References Cited

U.S. PATENT DOCUMENTS

| | | | | |
|---|---|---|---|---|
| 6,808,168 | B2 * | 10/2004 | Muramatsu | F16F 13/26 267/140.13 |
| 7,292,917 | B2 | 11/2007 | Kuang et al. | |
| 7,469,761 | B2 * | 12/2008 | Kuras | B60K 6/46 180/65.245 |
| 7,865,287 | B2 | 1/2011 | Huseman | |
| 8,209,103 | B2 * | 6/2012 | Oyama | B60K 6/445 180/65.21 |
| 8,666,580 | B2 | 3/2014 | Hashimoto | |
| 8,718,854 | B2 | 5/2014 | Hashimoto | |
| 9,026,344 | B2 * | 5/2015 | Yamamoto | B60K 6/448 123/179.16 |
| 2014/0024491 | A1 * | 1/2014 | Kobayashi | B60W 20/10 477/3 |

* cited by examiner

*Primary Examiner* — Erick R Solis
*Assistant Examiner* — Robert A Werner
(74) *Attorney, Agent, or Firm* — David Kelley; Brooks Kushman P.C.

(57) ABSTRACT

A vehicle includes an electric machine, an engine, an engine mount, and a controller. The engine has a base speed that corresponds to a speed of the electric machine and an engine power demand. The engine mount is disposed between the engine and a vehicle structure such as a frame or unibody. The controller is configured to, in response to compression of the engine mount, increase an engine speed to a value that is greater than the base speed to reduce engine lugging.

20 Claims, 6 Drawing Sheets

Motor Speed

| Engine Power Demand (y) \ x | 0 | 73 | 146 | 219 | 292 | 365 | 437 | 510 | 583 |
|---|---|---|---|---|---|---|---|---|---|
| 0 | 141 | 141 | 141 | 141 | 141 | 141 | 141 | 141 | 141 |
| 2500 | 141 | 141 | 141 | 141 | 141 | 141 | 141 | 141 | 141 |
| 5000 | 141 | 141 | 141 | 141 | 141 | 141 | 158 | 164 | 164 |
| 7500 | 141 | 141 | 141 | 141 | 141 | 141 | 166 | 188 | 197 |
| 10000 | 141 | 141 | 141 | 164 | 160 | 163 | 174 | 198 | 212 |
| 12500 | 214 | 214 | 214 | 200 | 196 | 193 | 196 | 208 | 218 |
| 15000 | 243 | 243 | 243 | 235 | 233 | 232 | 230 | 232 | 236 |
| 17500 | 275 | 275 | 275 | 264 | 258 | 254 | 251 | 249 | 255 |
| 20000 | 282 | 282 | 282 | 267 | 270 | 273 | 276 | 272 | 274 |

FIG. 4

Motor Speed

| Engine Power Demand (y) \ x | 0 | 73 | 146 | 219 | 292 | 365 | 437 | 510 | 583 |
|---|---|---|---|---|---|---|---|---|---|
| 0 | 149 | 236 | 236 | 236 | 236 | 236 | 236 | 236 | 236 |
| 2500 | 236 | 236 | 236 | 236 | 236 | 236 | 236 | 236 | 236 |
| 5000 | 236 | 236 | 236 | 236 | 236 | 236 | 236 | 236 | 236 |
| 7500 | 236 | 236 | 236 | 236 | 236 | 236 | 236 | 236 | 236 |
| 10000 | 236 | 236 | 236 | 236 | 236 | 236 | 236 | 236 | 236 |
| 12500 | 236 | 236 | 236 | 236 | 236 | 236 | 236 | 236 | 236 |
| 15000 | 149 | 149 | 149 | 149 | 149 | 236 | 236 | 236 | 236 |
| 17500 | 149 | 149 | 149 | 149 | 149 | 149 | 149 | 149 | 149 |
| 20000 | 149 | 149 | 149 | 149 | 149 | 149 | 149 | 149 | 149 |

FIG. 5

Motor Speed

| Wheel Torque Demand (y) \ x | 0 | 73 | 146 | 219 | 292 | 365 | 437 | 510 | 583 |
|---|---|---|---|---|---|---|---|---|---|
| 0 | 0 | 0 | 0 | 0 | 0 | 0 | 0 | 0 | 0 |
| 250 | 0.2 | 0.8 | 0.8 | 0.8 | 0.8 | 0.8 | 0.8 | 0.8 | 0.8 |
| 500 | 0.4 | 0.8 | 0.8 | 0.8 | 0.8 | 0.8 | 0.8 | 0.8 | 0.8 |
| 750 | 1 | 1 | 1 | 1 | 1 | 1 | 1 | 1 | 1 |
| 2000 | 1 | 1 | 1 | 1 | 1 | 1 | 1 | 1 | 1 |
| 2500 | 1 | 1 | 1 | 1 | 1 | 1 | 1 | 1 | 1 |

HYBRID VEHICLE AND METHOD OF REDUCING ENGINE LUGGING

TECHNICAL FIELD

The present disclosure relates to powertrains for hybrid electric vehicles.

BACKGROUND

Engine lugging is a term used to describe an operating condition of an internal combustion engine that corresponds to high engine torque and low engine speeds (high engine load). High levels of noise, vibration, and harshness (NVH) are often produced when an internal combustion engine is operating under a lugging condition. Hybrid electric vehicles may operate at high levels of engine torque and low vehicle and engine speeds to maximize fuel economy, which may result is NVH issues due to the engine of the hybrid electric vehicle operating at or near lugging operating conditions.

SUMMARY

A vehicle includes an electric machine, an engine, an engine mount, and a controller. The engine has a base speed that corresponds to a speed of the electric machine and an engine power demand. The engine mount is disposed between the engine and a vehicle frame. The controller is configured to, in response to compression of the engine mount, increase an engine speed to a value that is greater than the base speed to reduce engine lugging.

A vehicle includes an electric machine, an engine, an engine mount, and a controller. The engine has a base speed. The engine mount is disposed between the engine and a vehicle chassis structure. The controller is configured to, in response to a compression of the engine mount, increase an engine speed based on a difference between the base speed and a minimized lugging engine speed to reduce engine lugging.

A method of operating a hybrid powertrain having an engine and an electric machine includes increasing engine speed from a base speed associated with electric machine speed and engine power demand in response to measured or inferred compression of engine mounts to reduce engine lugging.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

One class of hybrid electric vehicle powertrains, commonly referred to as a power-split powertrain, has two sources of power. The first source includes an internal combustion engine, and the second source includes a combination of an electric motor, a generator and a battery. The engine and the generator, together with a planetary gear set, a countershaft and a motor, establish a mechanical torque flow path and an electromechanical torque flow path to vehicle traction wheels. The battery is an energy-storing device for the generator and the motor. Engine power is divided into two power flow paths at any generator speed and vehicle speed. Engine speed is controlled by the generator speed, which implies that the engine speed can be decoupled from the vehicle speed within the allowed speed range of the generator. This mode of operation is called "positive power split", when the generator is generating electrical power using mechanical power input from the engine.

Because of the mechanical properties of the planetary gear set, the generator can distribute power to the planetary gear set to drive the vehicle. This mode of operation is called "negative power split". The combination of a generator, a motor and a planetary gear set thus can be considered to have electrical continuously variable (e-CVT) transmission characteristics.

A generator brake can be activated so that engine output power is transmitted with a fixed gear ratio to the torque output side of the powertrain through a mechanical path only. The first power source can only affect forward propulsion of the vehicle since there is no reverse gear. The engine requires either generator control or application of a generator brake to transmit output power for forward drive.

When the second power source is active, the electric motor draws power from the battery and drives the vehicle independently of the engine for both forward drive and reverse drive. The motor may also generate power and charge the battery if the engine produces power exceeding driver demand, or in a regenerative mode capturing vehicle kinetic energy. In addition, the generator can draw power from the battery and drive against a one way clutch on the engine power output shaft to propel the vehicle in a forward direction. This mode of operation is called "generator drive mode". A vehicle system controller coordinates the two power sources so that they work together seamlessly to meet a driver's torque demand without exceeding powertrain system limits. The vehicle system controller allows continuous regulation of engine speed for any given vehicle speed and power request. The mechanical power flow path provides efficient power delivery through the planetary gear set to the driveshaft.

Figure 1:
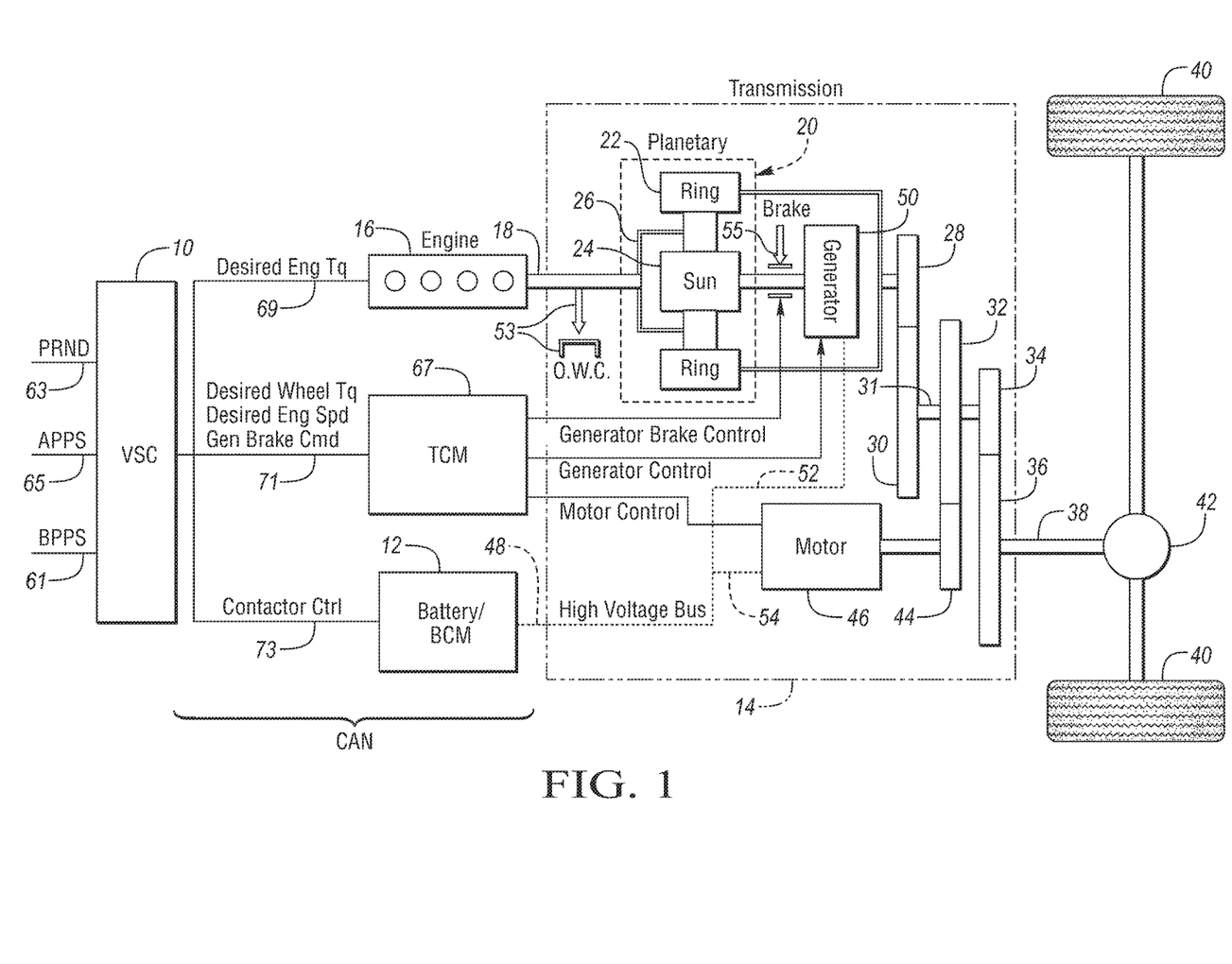
FIG. 1 is a schematic illustrating an exemplary hybrid vehicle having a power-split powertrain.

Referring to FIG. 1, a hybrid electric vehicle having a power-split (or series-parallel) powertrain is illustrated. The powertrain includes two power sources that are connected to the driveline: (1) an engine 16 and an electric-machine 50 (which may be referred to as a generator) connected together via a planetary gear arrangement 20; and (2) an electric drive system including a battery 12, an electric-machine 46 (which may be referred to as a motor) and generator 50. Battery 12 is an energy storage system for motor 46 and generator 50.

A vehicle system controller (VSC) 10 is configured to send control signals to and receive sensory feedback information from one or more of the battery 12, engine 16, motor 46, and generator 50 for power to be provided to vehicle traction wheels 40 for propelling the vehicle. Controller 10 controls the power source proportioning between battery 12 and engine 16 for providing power to propel the vehicle and thereby controls the state of charge (SOC) of battery 12.

While illustrated as one controller, the controller 10 may be part of a larger control system and may control or may be controlled by various other controllers throughout the vehicle. It should therefore be understood that the controller 10 and one or more other controllers can collectively be referred to as a "controller" that controls various actuators in response to signals from various sensors to control functions such as starting/stopping engine 16, operating the motor 46 or generator 50 to provide wheel torque or charge the battery 12, etc. Controller 10 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling various components of the vehicle.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42. Gears 30, 32, and 34 are mounted on a counter shaft 31 with gear 32 engaging a motor-driven gear 44. Motor 46 drives gear 44. Gear 44 acts as a torque input for counter shaft 31. Engine 16 distributes torque through input shaft 18 to transmission 14. The battery 12 delivers electric power to the motor 46 through power flow path 48. The generator 50 is connected electrically to battery 12 and to motor 46, as shown at 52.

While the battery 12 is acting as a sole power source with engine 16 off, input shaft 18 and carrier assembly 26 are braked by an overrunning coupling (i.e., one-way clutch (OWC)) 53. A mechanical brake 55 anchors the rotor of the generator 50 and sun gear 24 when the engine 16 is on and the powertrain is in a parallel drive mode, the sun gear 24 acting as a reaction element.

The controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. The controller 10 issues a desired engine torque request to engine 16, as shown at 69, which is dependent on accelerator pedal position sensor (APPS) output 65. A brake pedal position sensor (BPPS) distributes a wheel brake signal to the controller 10, as shown at 61. A brake system control module (not shown) may issue to the controller 10 a regenerative braking command based on information from the BPPS. The TCM 67 issues a generator brake control signal to the generator brake 55. The TCM 67 also distributes a generator control signal to the generator 50.

Figure 2:
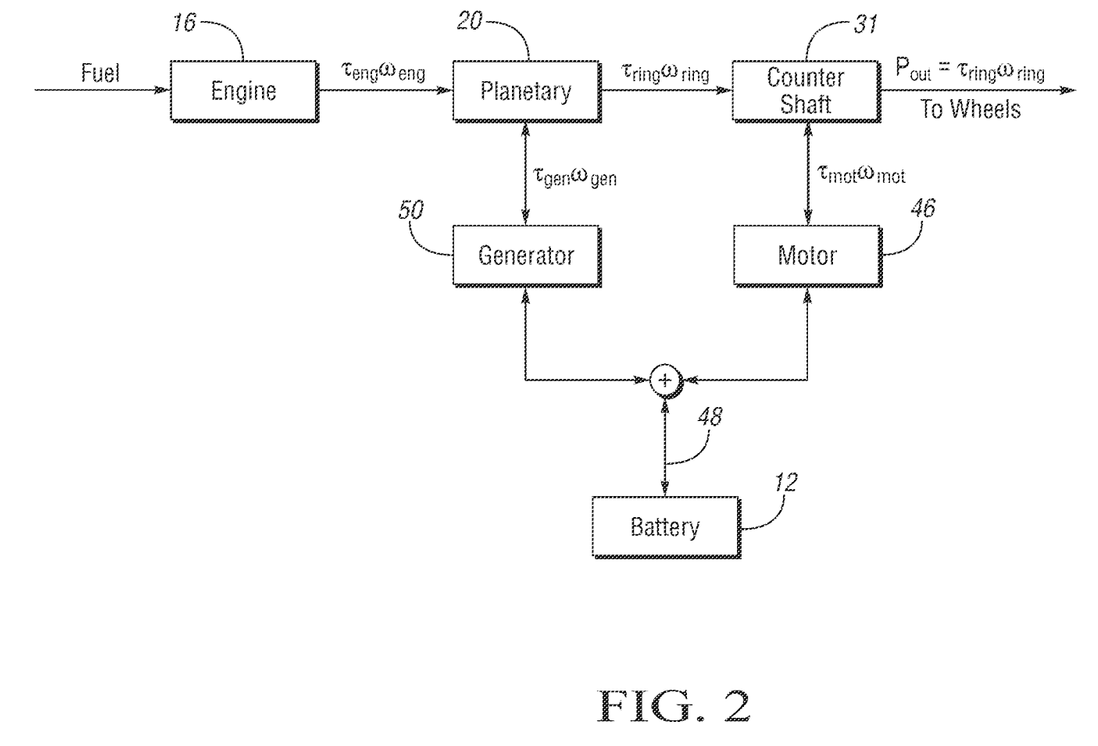
FIG. 2 is a diagram illustrating torque and speed transmission through a power-split powertrain.

Referring to FIG. 2, a block diagram of power flow paths between the various components of the powertrain of FIG. 1 is shown. Fuel is delivered to the engine 16 under the control of the driver using an engine throttle. The engine 16 delivers engine power ($\tau_{eng}\omega_{eng}$, where $\tau_{eng}$ is engine torque and $\omega_{eng}$ is engine speed) to the planetary gear arrangement 20. The planetary gear arrangement 20 delivers power ($\tau_{ring}\omega_{ring}$, where $\tau_{ring}$ is the ring gear torque and $\omega_{ring}$ is the ring gear speed) to the counter shaft 31. The output shaft 38 outputs power ($P_{out}=\tau_{out}\omega_{out}$, where $\tau_{out}$ and $\omega_{out}$ are the torque and speed of output shaft 38, respectively) to the wheels 40. The generator 50 can deliver power to or be driven by planetary gear arrangement 20. Similarly, power distribution between the motor 46 and the counter shaft 31 can be distributed in either direction. Driving power from the battery 12 or charging power to battery 12 is represented by the bi-directional arrow 48.

The engine output power ($\tau_{eng}\omega_{eng}$) can be split into a mechanical power flow path ($\tau_{ring}\omega_{ring}$) and an electrical power flow path ($\tau_{gen}\omega_{gen}$ to $\tau_{mot}\omega_{mot}$, where $\tau_{gen}$ is the generator torque, $\omega_{gen}$ is the generator speed, $\tau_{mot}$ is the motor torque, and $\omega_{mot}$ is the motor speed). In this so-called positive split mode of operation, the engine 16 delivers power to the planetary gear arrangement 20 which delivers power ($\tau_{ring}\omega_{ring}$) to the counter shaft 31 which in turn drives the wheels 40. A portion of the planetary gearing power ($\tau_{gen}\omega_{gen}$) is distributed to the generator 50, which delivers charging power to the battery 12. The battery 12 drives the motor 46, which distributes power ($\tau_{mot}\omega_{mot}$) to counter shaft 31.

If the generator brake 55 is activated, a parallel operating mode is established. In the parallel operating configuration, the engine 16 is on and the generator 50 is braked. The battery 12 powers the motor 46, which powers counter shaft 31 simultaneously with delivery of power from the engine 16 to the planetary gear arrangement 20 to the counter shaft 31. During operation with the second power source (described as including battery 12, motor 46, and generator 50), the motor 46 draws power from the battery 12 and provides propulsion independently from engine 16 to the drivetrain.

As described, the hybrid vehicle has two power sources for delivering driving power to the wheels 40. The first power source includes the engine 16 and the second power source includes the battery 12. The engine 16 and the battery 12 can provide traction power either simultaneously or independently. The controller 10 controls the electric energy and fuel energy proportioning to meet the propulsion requirements and thereby controls the engine 16 and the battery 12 accordingly.

As may be observed, the planetary gearing arrangement 20 imposes speed and torque relationships among the engine 16, generator 50, and the vehicle traction wheels 40. As discussed above, the generator 50 may be controlled to transfer power from the engine 16 to vehicle traction wheels 40 using the planetary gearing arrangement 20 as a CVT. However, at some operating conditions, the losses incurred by operating the generator 50 exceed the energy benefit of the CVT.

As an example, when the vehicle is in "steady state" operation, such as cruising at a generally constant speed, the generator 50 incurs operational losses while the gear ratio between the engine 16 and traction wheels 40 remains generally unchanged. Here, steady state operation refers to a constant vehicle speed, constant driver power request, and generally consistent quantity of engine power used to charge the vehicle. This generally occurs when the driver power demand is roughly the same as the "road load", or the sum of forces acting on the vehicle (e.g. rolling resistance, aerodynamic drag, etc.).

Figure 3:
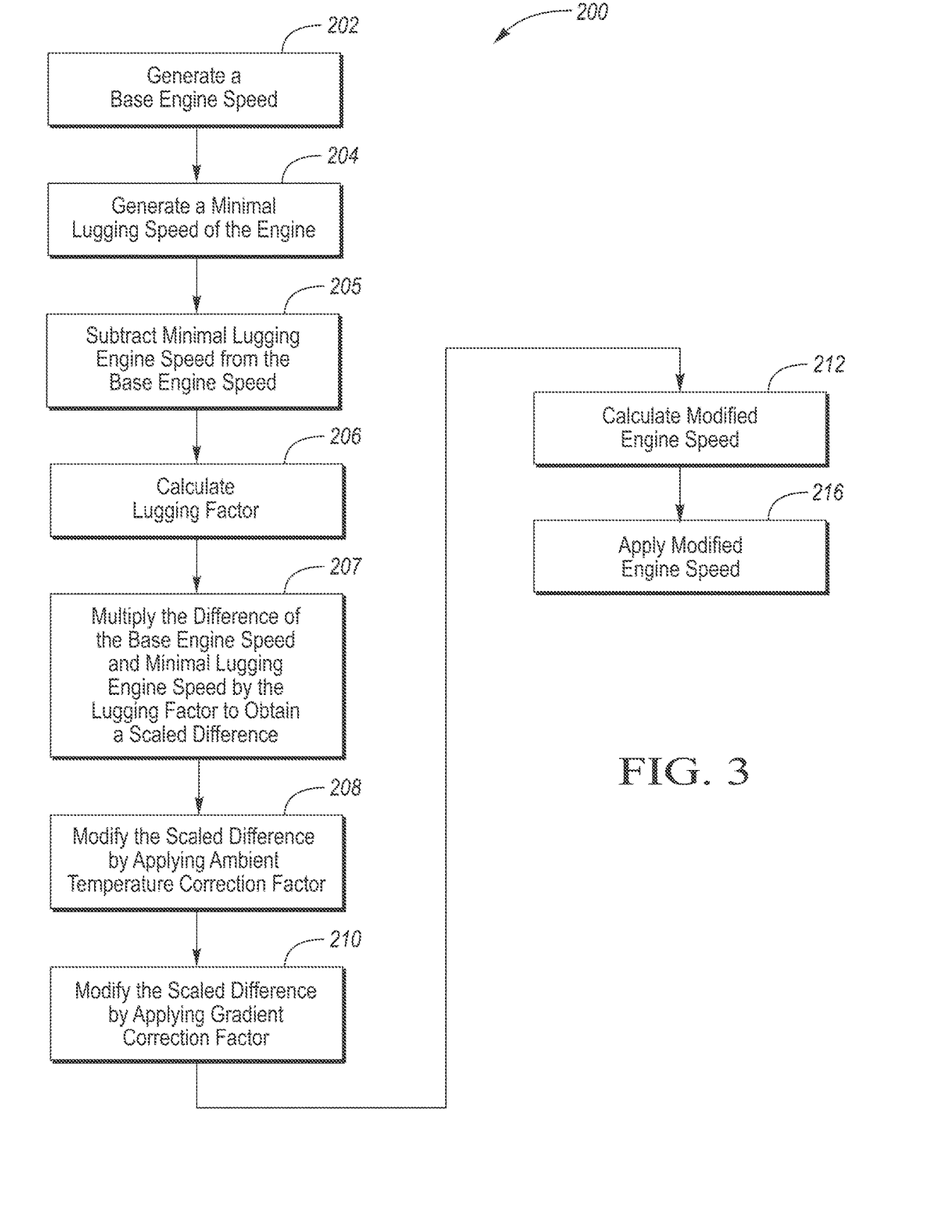
FIG. 3 is a flowchart illustrating a method of reducing engine lugging in a hybrid vehicle.

Referring to FIG. 3, a flowchart of a method 200 for reducing engine lugging of the engine 16 of the hybrid electric vehicle is illustrated. Engine lugging is a term used to describe an operating condition of an internal combustion engine that corresponds to high engine torque and low engine speeds (high engine load). High levels of noise, vibration, and harshness (NVH) are often produced when an internal combustion engine is operating under a lugging condition. Characteristics of an engine mount may have a significant effect on engine lugging. Engine mounts are generally made of a flexible material, such as rubber, which dampens engine vibrations. As the vehicle accelerates/decelerates, engine mounts may be compressed due to wheel torque reaction which may reduce the damping effects of the engine mounts. This increases vibrations transmitted to the body of the vehicle and may cause customer dissatisfaction. Cold weather conditions may also affect mount stiffness. The rubber material may harden reducing its damping effects, increasing NVH levels inside the vehicle. In addition, the engine may be used to provide heat for the passenger compartment providing high levels of power at a low idle speed. Engine lugging may be exacerbated in this situation because the engine is producing a high level of torque at a relatively low speed. Road gradient may also affect lugging levels due to higher mount compression caused by steeper grades and/or the higher wheel torques required to sustain forward vehicle speeds on a steep grade, which may also increase NVH levels in the vehicle. It may be possible to alleviate engine lugging by raising engine speed for a given power demand or reducing engine torque for a given power demand. The method 200 may be applied while the vehicle is moving in forward or reverse (including forward and reverse applications of torque within the powertrain or driveline). The method may also be applied while the engine 16 is idling under increased power demands (e.g., when the engine 16 is providing heat for the passenger compartment while idling at low speeds). Finally, the method 200 may further be applied while the vehicle is operating is any of the modes listed above, including during periods of regenerative braking.

The method 200 may be implemented via algorithms and/or control logic that are stored within the memory of the controller 10. The controller 10 may include a series of input channels and output channels to communicate with and control various components of the vehicle 10. Signals indicative of various states of the vehicle may be received by the controller 10 via the input channels and signals indicative of commands may be sent from the controller 10 to various components of the vehicle. The controller 10 may also include internal input and output channels such that the various components (described in further detail below) that comprise the controller 10 may communicate with each other.

At step 202, the method 200 includes first generating or scheduling the base speed of the engine 16 relative to the speed of the motor 46 and the engine power demand. Vehicle speed is utilized to determine the motor speed, since vehicle speed is directly proportional to motor speed due to the motor 46 being directly coupled to the wheels 40 through a series of gears. Wheel torque demand is utilized to determine the engine power demand. The wheel torque demand may be a function of the position of an accelerator pedal and the vehicle speed. Once the wheel torque demand is determined, the engine power demand may then be determined, which may be function of wheel torque and wheel speed (which is proportional to vehicle speed). The base engine speeds may be stored in a base engine speed scheduling table. The base engine speed scheduling table is a chart of the engine speeds to achieve a desired fuel economy, each speed corresponding to a relative speed of the motor 46 and a relative engine power demand.

Figure 4:
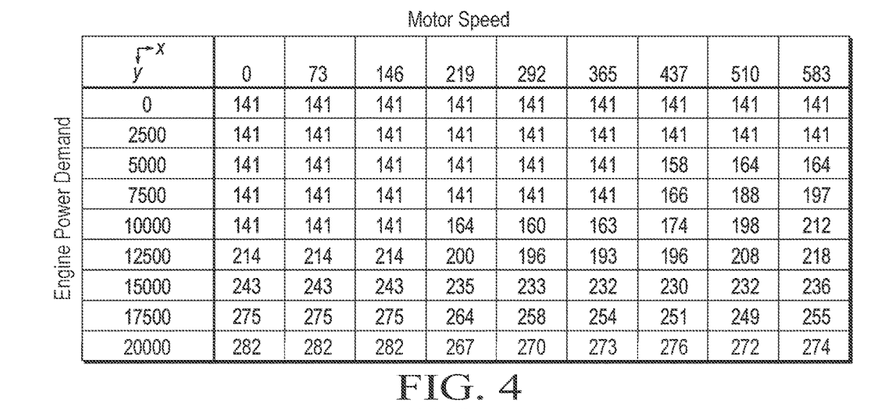
FIG. 4 is a representative chart illustrating a base engine speed scheduling table.

FIG. 4 is a representative chart illustrating a base engine speed scheduling or lookup table. The values in the table represent the scheduled base engine speed indexed by engine power demand along the y-axis and motor speed of motor 46 along the x-axis The cells in the first (top) row of the chart (denoted as X) represent increasing speeds of the motor 46. The cells in the first (furthest left) column of the chart (denoted as Y) represent increasing power demands of the engine. The scheduled base engine speed corresponds to the table value at the intersection of the engine power demand row and motor speed column. Proportional extrapolation or other algorithms may be used to determine the engine speeds for intermediate values of the motor speed or engine power demand that happen to fall between the listed values in the base engine speed scheduling table. Although a two-dimensional lookup table is illustrated in FIG. 4, other vehicle or ambient operating parameters may also be used to index a multi-dimensional lookup table to schedule a base engine speed.

Referring again to FIG. 3, after determining the base speed of the engine 16, the method 200 determines a minimum lugging speed of the engine 16 (a speed of the engine 16 at which engine lugging is minimized) for the corresponding speed of the motor 46 and the engine power demand as represented at 204. This minimum lugging speed of the engine 16 can be determined via calibration tools that are used to determine the engine speed at which engine lugging is minimized for a given vehicle speed and engine power demand. The minimum lugging engine speeds may be stored in a corresponding scheduling or lookup table as illustrated and described with reference to FIG. 5. The engine speed where lugging is minimized as represented in the table of FIG. 5 may be higher than the base speed of the engine 16 that corresponds to the same speed of the motor 46 and engine power demand as represented in the table of FIG. 4.

Figure 5:
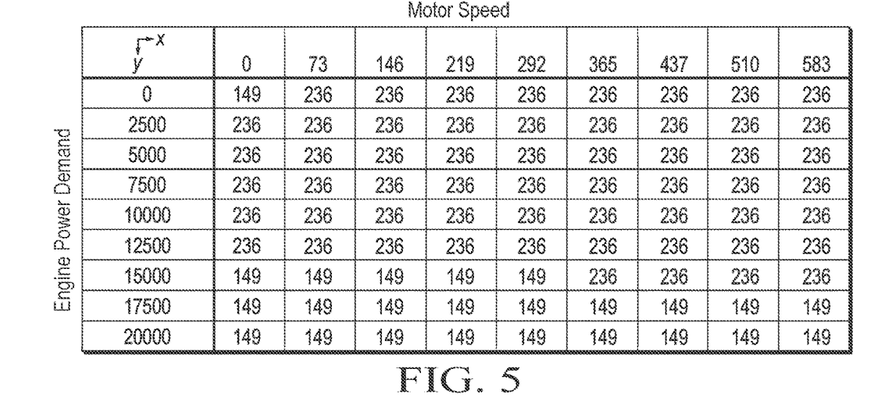
FIG. 5 is a representative chart illustrating a minimized lugging engine speed scheduling table.

FIG. 5 is a representative chart illustrating a minimum lugging engine speed lookup or scheduling table with engine speed values indexed by motor speed along the x-axis and engine power demand along the y-axis. The cells in the first (top) row of the chart (denoted as X) represent increasing speeds of the motor 46. The cells in the first (furthest left) column of the chart (denoted as Y) represent increasing engine power demands. Proportional extrapolation or other algorithms may be used to determine the engine speeds where lugging is minimized for intermediate values of the motor speed or engine power demand that happen to fall between the listed values in the chart.

Referring again to FIG. 3, after determining the minimum lugging speed of the engine 16 based on the current motor speed and engine power demand, the minimal lugging speed of the engine 16 is subtracted from the base speed of the engine at step 205 followed by determining a lugging scale factor at step 206. The lugging scale factor is used to modify the difference between the minimum lugging engine speed and the base engine speed. The lugging scale factor may be based on empirical data obtained from testing and may correspond to an engine speed adjustment that reduces NVH. The lugging scale factor is used to modify the engine speed in response to an estimated or inferred amount of engine mount compression. The estimated or inferred amount of engine mount compression may be based on average or peak values of cyclical engine mount compression. Compressed engine mounts may lead to increased NVH issues where engine vibration is transmitted to the body and/or frame of the vehicle. To minimize the NVH issues associated with engine lugging under operating conditions where the engine mounts may be compressed and transmit more vibration to the vehicle steering column and seat rails, the base engine speed is increased for a given engine power demand. The lugging scale factor may be stored in a lugging scale factor table. The lugging scale factor table is a chart of lugging scale factors, each lugging scale factor corresponding to a speed of the motor 46 and a torque demand at the wheels 40.

Figure 6:
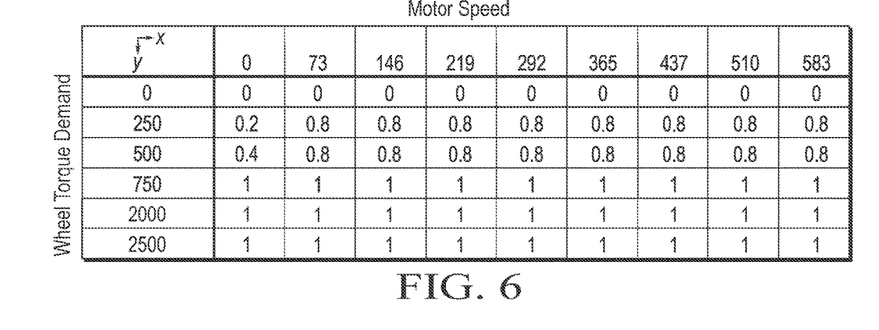
FIG. 6 is a representative chart illustrating a scaling factor for the minimized lugging engine speeds charted in FIG. 5.

FIG. 6 is a representative chart illustrating a lugging scale factor table. The cells in the first (top) row of the chart (denoted as X) represent increasing speeds of the motor 46. The cells in the first (furthest left) column of the chart (denoted as Y) represent increasing torque demands at the wheels 40. Each cell that is neither in the first row nor in the first column represents a lugging scale factor corresponding to the speed of the motor 46 that shares the same column as the cell and the torque demands at the wheels 40 that shares the same row as the cell. Proportional extrapolation or other algorithms may be used to determine the lugging scale factor for intermediate values of the motor speed or torque demand at the wheels 40 that happen to fall between the listed values in the chart.

Referring once again to FIG. 3, after determining the lugging scale factor, the method 200 moves on to step 207 where the difference between the base speed of the engine 16 and the minimal lugging speed of the engine 16 is multiplied by the lugging scale factor to produce a scaled difference. After determining the scaled difference, the method 200 moves on to step 208 where the scaled difference is modified by applying an ambient temperature correction factor. The ambient temperature correction factor adjusts the scaled difference to account for increased stiffness of the engine mounts that corresponds to lower temperatures. Increased stiffness may lead to increased NVH issues transmitted from the engine 16 to the body and/or frame of the vehicle. The ambient temperature correction factor is based on an algorithm that may lead to an increased speed of the engine 16 in response to a decrease in temperature that causes the stiffness of the engine mounts to increase. The ambient temperature correction factor may be a term that is either added to or subtracted from the scaled difference. Alternatively, the ambient temperature correction factor may be a multiplier term, where the scaled difference is multiplied by the ambient temperature correction factor.

The method 200 then moves on to step 210 where the scaled difference is further modified by applying a road gradient correction factor. The road gradient correction factor adjusts the scaled difference to account for steeper grades requiring higher engine speeds and/or the gradient causing increased compression of the engine mounts which may lead to increased NVH issues. The road gradient correction factor is based on an algorithm that may lead to an increased speed of the engine 16 in response to an increase in the road gradient. The road gradient correction factor may be a term that is either added to or subtracted from the scaled difference. Alternatively, the road gradient correction factor may be a multiplier term, where the scaled difference is multiplied by the road gradient correction factor.

The method 200 then determines a modified engine speed at step 212 by adding the scaled difference (that may have been adjusted by the ambient temperature correction factor and/or the road gradient correction factor) to the base speed of the engine 16. After determining the modified engine speed, the method 200 applies the modified engine speed which is commanded to the engine 16 at step 216.

Figure 7:
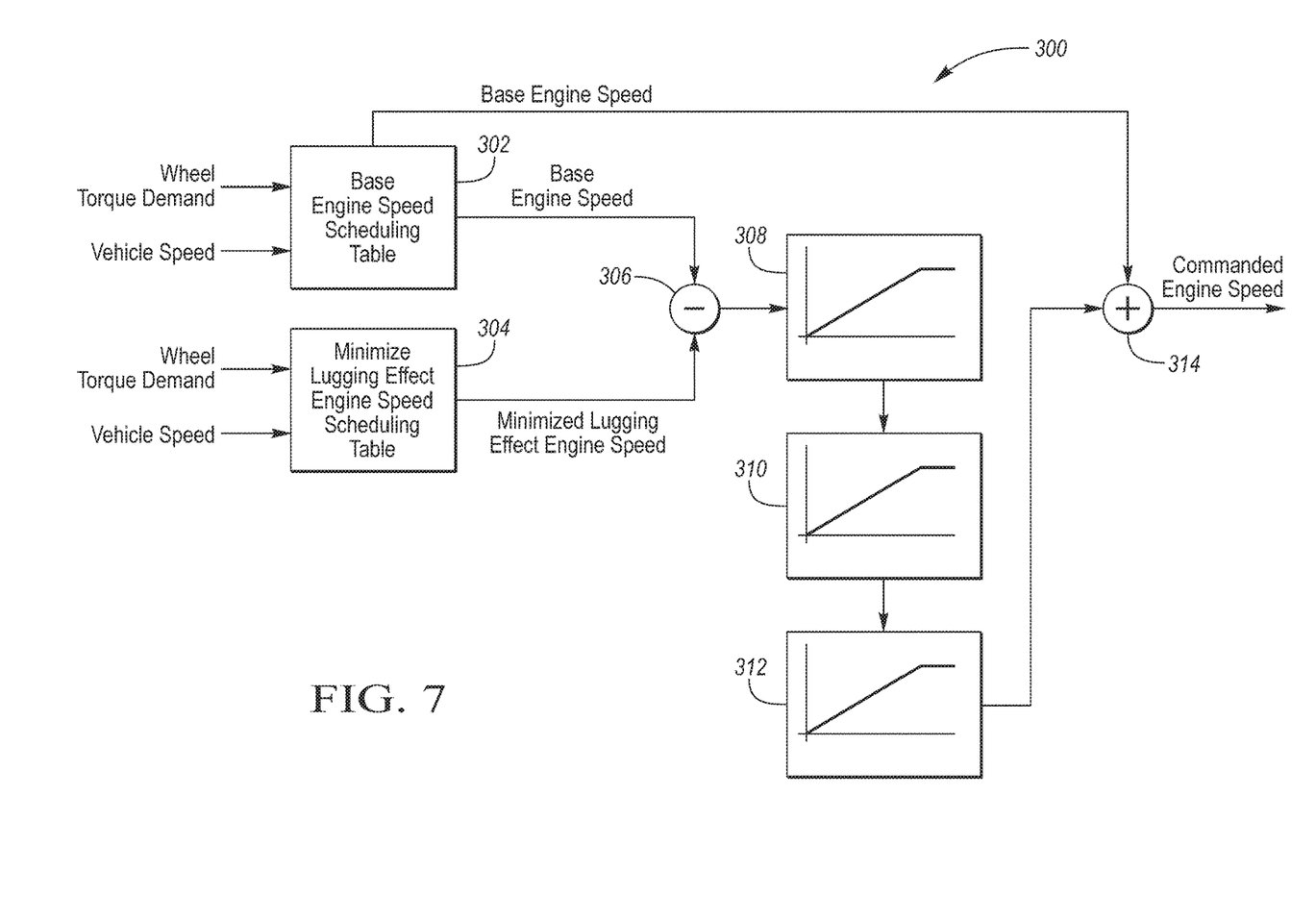
FIG. 7 is a control diagram illustrating operation of a representative system or method of reducing engine lugging in a hybrid vehicle.

Referring to FIG. 7, a control diagram 300 illustrating modifying engine speed to reduce engine lugging in the hybrid vehicle is illustrated. First, the wheel torque demand and vehicle speed are input into a base engine speed scheduling table 302 (e.g., the representative chart of the base engine speed scheduling table described in FIG. 4) and a minimized lugging effect engine speed scheduling table 304 (e.g., the representative chart of the minimized lugging effect engine speed scheduling table described in FIG. 5). The vehicle speed that is input into the tables will be utilized to determine the motor speed in both the base engine speed scheduling table 302 and the minimized lugging effect engine speed scheduling table 304, since vehicle speed is directly proportional to motor speed due to the motor 46 being directly coupled to the wheels 40 through a series of gears. The wheel torque demand that is input into the tables will be utilized to determine the engine power demand in both the base engine speed scheduling table 302 and the minimized lugging effect engine speed scheduling table 304. The wheel torque demand may be a function of the position of an accelerator pedal and the vehicle speed. Once the wheel torque demand is determined, the engine power demand may be then determined, which may be function of wheel torque and wheel speed (which is proportional to vehicle speed). Based on the determined motor speed value and engine power demand value, the base engine speed scheduling table 302 outputs a base engine speed and the minimized lugging effect engine speed scheduling table 304 outputs a minimized lugging effect engine speed.

The base engine speed is then subtracted from the minimized lugging effect engine speed at subtraction node 306. The difference between the minimized lugging effect engine speed and the base engine speed is then input into a lugging scale factor table 308 (e.g., the representative chart of the lugging scale factor table described in FIG. 6). The scaled difference between the minimized lugging effect engine speed and the base engine speed may then be adjusted by an ambient temperature correction factor at block 310 and/or a road gradient correction factor at block 312. The scaled difference between the minimized lugging effect engine speed and the base engine speed (that may have been adjusted by the ambient temperature correction and/or the road gradient correction factor) is then input into summation block 314 where it is added to the base engine speed. The output of the summation block 314 is the commanded engine speed.

Figure 8:
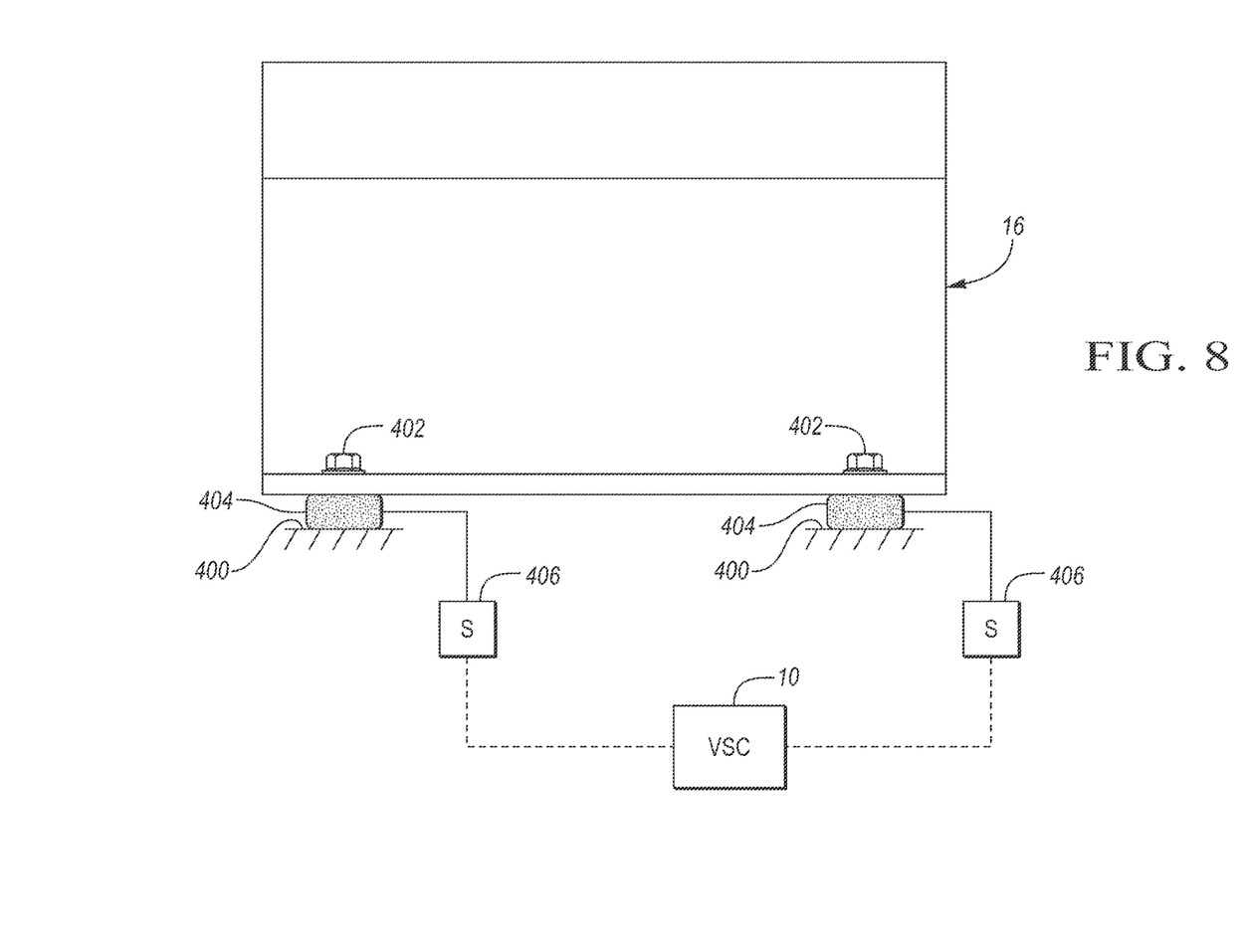
FIG. 8 is a side view of a representative internal combustion engine of a hybrid vehicle.

Referring to FIG. 8, a side view of the internal combustion engine 16 of the hybrid vehicle is illustrated. The engine 16 may be secured to a vehicle structure, such as a unibody or frame 400 of the vehicle. The engine 16 may be secured to the frame 400 or unibody by a series of bolts 402. Engine mounts 404 may be disposed between the engine 16 and the frame 400. The engine mounts may be made from a flexible material to absorb vibrations that are generated by the engine 16. The engine mounts 404 may be made from, but not limited to, rubber, soft plastic, plastic foam, or any other material that is capable of both supporting the engine 16 and absorbing engine vibrations. Sensors 406 may be utilized to measure the magnitude of the compression of the engine mounts 404. More specifically, the sensors 406 may determine the magnitude of the compression of the engine mounts 404 by measuring displacement of the engine 16 relative to the frame 400. The sensors 406 may then communicate the magnitude of the compression of the engine mounts 404 to the controller 10.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an electric machine;
an engine;
an engine mount securing the engine to the vehicle; and
a controller configured to, in response to compression of the engine mount, increase an engine speed to a value that is greater than a base engine speed corresponding to electric machine speed and engine power demand to reduce engine lugging.

2. The vehicle of claim 1, wherein the compression of the engine mount is an estimate based on a wheel torque demand and a vehicle speed.

3. The vehicle of claim 1, wherein the engine speed is increased by a value that is based on multiplying a scaling factor by a difference between the base engine speed and a minimized lugging engine speed.

4. The vehicle of claim 3, wherein the minimized lugging engine speed corresponds to an engine speed where engine lugging is reduced relative to the base speed when the engine mount is compressed.

5. The vehicle of claim 3, wherein the increase in engine speed is also based on ambient temperature.

6. The vehicle of claim 3, wherein the increase in engine speed is also based on road gradient.

7. The vehicle of claim 1, wherein the magnitude of the compression of the engine mount is a measured displacement of the engine relative to the vehicle.

8. A vehicle comprising:
an electric machine;
an engine;
an engine mount disposed between the engine and a vehicle structure; and
a controller configured to, in response to compression of the engine mount, control engine speed based on a difference between a base engine speed and a minimized lugging engine speed to reduce engine lugging.

9. The vehicle of claim 8, wherein the controller increases engine speed by a value that is based on multiplying a scaling factor by the difference between the base engine speed and the minimized lugging engine speed.

10. The vehicle of claim 9, wherein the minimized lugging engine speed corresponds to an engine speed where engine lugging is reduced relative to the base engine speed for a corresponding wheel torque demand and vehicle speed.

11. The vehicle of claim 9, wherein the increase in engine speed is also based on ambient temperature.

12. The vehicle of claim 9, wherein the increase in engine speed is also based on road gradient.

13. The vehicle of claim 8, wherein the compression of the engine mount is based on a wheel torque demand and a vehicle speed.

14. The vehicle of claim 8, wherein the base engine speed is based on a speed of the electric machine and an engine power demand.

15. A method of operating a hybrid powertrain having an engine and an electric machine comprising:
increasing engine speed by a controller from a base speed associated with an electric machine speed and an engine power demand based on compression of an engine mount to reduce engine lugging.

16. The method of claim 15, further comprising inferring compression of the engine mount based on a wheel torque demand and a vehicle speed.

17. The method of claim 15, wherein the engine speed is increased by a value that is based on multiplying a scaling factor by a difference between the base speed and a minimized lugging engine speed.

18. The method of claim 17, wherein the minimized lugging engine speed corresponds to an engine speed where engine lugging is reduced relative to the base speed for corresponding engine power demand and motor speed.

19. The method of claim 17, wherein the increase in engine speed is also based on ambient temperature.

20. The method of claim 17, wherein the increase in engine speed is also based on road gradient.

* * * * *